US011236560B2

(12) United States Patent
Kapila et al.

(10) Patent No.: US 11,236,560 B2
(45) Date of Patent: Feb. 1, 2022

(54) INTERNALLY HEATED SCREWS

(71) Applicant: Halliburton Energy Services, Inc., Houston, TX (US)

(72) Inventors: Rajesh C. Kapila, Houston, TX (US); Barry Hoffman, Saskatchewan (CA)

(73) Assignee: Halliburton Energy Services, Inc., Houston, TX (US)

(*) Notice: Subject to any disclaimer, the term of this patent is extended or adjusted under 35 U.S.C. 154(b) by 77 days.

(21) Appl. No.: 16/639,396

(22) PCT Filed: May 3, 2019

(86) PCT No.: PCT/US2019/030688
§ 371 (c)(1),
(2) Date: Feb. 14, 2020

(87) PCT Pub. No.: WO2020/226606
PCT Pub. Date: Nov. 12, 2020

(65) Prior Publication Data
US 2021/0131202 A1    May 6, 2021

(51) Int. Cl.
*E21B 21/06* (2006.01)
*E21B 43/34* (2006.01)
(Continued)

(52) U.S. Cl.
CPC .......... *E21B 21/065* (2013.01); *B01D 21/009* (2013.01); *B01D 21/2461* (2013.01);
(Continued)

(58) Field of Classification Search
CPC ...... E21B 21/06; E21B 21/063; E21B 21/065; E21B 21/066; E21B 21/067; B01D 21/00;
(Continued)

(56) References Cited

U.S. PATENT DOCUMENTS

| | | | | |
|---|---|---|---|---|
| 4,208,285 A | * | 6/1980 | Sample, Jr. | E21B 21/066 210/180 |
| RE33,776 E | * | 12/1991 | Noland | B09C 1/06 110/346 |
| 5,216,821 A | * | 6/1993 | McCabe | B01J 19/20 34/180 |
| 6,464,430 B1 | * | 10/2002 | Maleck | B09C 1/00 110/241 |

(Continued)

FOREIGN PATENT DOCUMENTS

| | | |
|---|---|---|
| CN | 103935011 A | 7/2014 |
| WO | 2017190227 A1 | 11/2017 |

OTHER PUBLICATIONS

International Search Report and Written Opinion dated Feb. 3, 2020, International PCT Application No. PCT/US2019/030688.

*Primary Examiner* — Nicole Coy
(74) *Attorney, Agent, or Firm* — McGuireWoods LLP

(57) ABSTRACT

Provided are systems and methods that are related to a fluid processing unit. A method for separating a drilling waste fluid, the method comprising: introducing drilling waste fluid into a thermal extraction chamber; allowing drilling waste fluid to flow longitudinally along two screws disposed within thermal extraction chamber, wherein each screw comprises a shaft, an orifice, and an internal heating element; allowing internal heating element to provide heat to thermal extraction chamber; allowing at least a portion of the drilling waste fluid to evaporate; removing evaporated fluid through a first outlet; removing solids through a second outlet. A thermal extraction chamber for separating drilling waste fluids, wherein thermal extraction chamber comprises: a barrel; a first screw; a second screw, wherein first screw and the second screw comprise a shaft, an orifice, a an internal heating element; an inlet port; a first outlet port; and a second outlet port.

18 Claims, 4 Drawing Sheets

(51) Int. Cl.
*E21B 21/01* (2006.01)
*E21B 36/04* (2006.01)
*B01D 21/24* (2006.01)
*F26B 11/12* (2006.01)
*F26B 17/20* (2006.01)
*B01D 21/00* (2006.01)

(52) U.S. Cl.
CPC .............. *E21B 21/01* (2013.01); *E21B 36/04* (2013.01); *E21B 43/35* (2020.05); *F26B 11/12* (2013.01); *F26B 17/20* (2013.01)

(58) Field of Classification Search
CPC ..... B01D 21/009; B01D 21/2461; F26B 3/24; F26B 11/12; F26B 17/20
See application file for complete search history.

(56) References Cited

U.S. PATENT DOCUMENTS

| | | | |
|---|---|---|---|
| 6,840,712 B2* | 1/2005 | Satchwell | B09B 3/00 37/351 |
| 8,945,350 B2* | 2/2015 | Bratina | B01D 1/223 203/87 |
| 9,939,197 B2* | 4/2018 | Hoffman | F26B 3/02 |
| 2008/0295356 A1* | 12/2008 | Nickerson | F26B 17/20 34/519 |
| 2009/0007484 A1 | 1/2009 | Smith | |
| 2010/0288618 A1 | 11/2010 | Feerer et al. | |
| 2015/0068806 A1 | 3/2015 | Toro et al. | |
| 2015/0338162 A1 | 11/2015 | Hoffman | |

\* cited by examiner

INTERNALLY HEATED SCREWS

BACKGROUND

Drilling fluids may be circulated through a wellbore during a drilling operation, for example, to remove cuttings (i.e., small pieces of the formation that break away during drilling) and to cool the drill bit. In some instances, drilling fluids are an oil-based fluid that includes a weighting agent. Typically, weighting agents include particles of high-density minerals that increase the density of the drilling fluid. Increasing the density of the drilling fluid may help to stabilize the wellbore and mitigate formation fluid intrusion into the wellbore.

As drilling fluids are circulated through the wellbore during the drilling process, the drilling fluids collect drilled solids or "cuttings." These cuttings affect the properties of the drilling fluid. Accordingly, drilling fluids may be passed through a series of processes or apparatuses to remove the cuttings (e.g., vibrating screens for filtration). However, as the drilling continues, the cuttings are further broken down into smaller and smaller particles that cannot be effectively removed by normal mechanical means. Further, the density of cuttings is often sufficiently low that gravity or centrifugal methods to remove the cuttings is inefficient or ineffective. Once the properties of the drilling fluid are deemed unfit for drilling, the drilling fluid is considered to be a "spent" drilling fluid and/or a drilling waste fluid that is now waste.

Disposing of spent drilling fluid may involve burning the contents in a cement kiln. Some have attempted to recover the oil from the drilling fluid. For example, the spent drilling fluid may be heated in a high temperature calciner to vaporize the fluid that can then be condensed and recovered. However, high temperature processes can be energy intensive and, in some instances, may crack or degrade the oil, which reduces the ability to reuse the oil in a new drilling fluid.

BRIEF DESCRIPTION OF THE DRAWINGS

These drawings illustrate certain aspects of some of the present disclosure, and should not be used to limit or define the disclosure.

DETAILED DESCRIPTION

The present disclosure may be directed to oil and gas production wells, and, at least in part, to using fluid processing units to "clean" drilling waste fluids. The fluid processing units may utilize thermal desorption to accomplish separation of the drilling waste fluids. Specifically, the present disclosure may utilize a thermal extraction chamber to accomplish separation of the drilling waste fluids. In an embodiment, thermal extraction chamber may comprise a screw or a plurality of screws. The screws disclosed herein may be hollow and may provide internal heating to a thermal extraction chamber. Embodiments of the present disclosure may maximize the available heat input into the process thereby reducing the overall footprint of the extraction chamber while maintaining and or potentially increasing the throughput. The amount of additional power added via screws may be linearly proportional to the improved throughput and subsequent footprint utilization.

Figure 1:
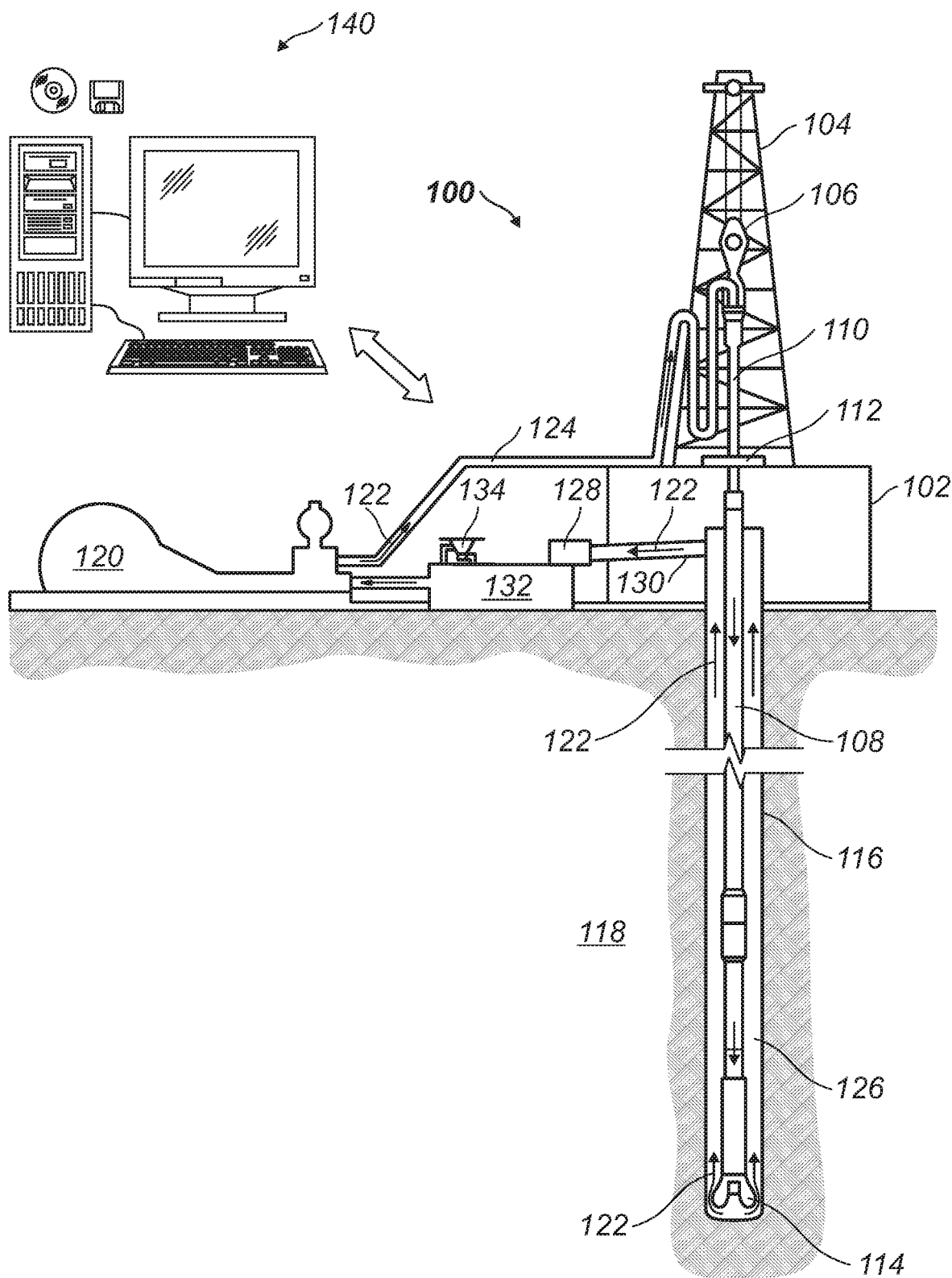
FIG. 1 illustrates wellbore drilling assembly.

FIG. 1 illustrates wellbore drilling assembly 100. In an embodiment, drilling fluids may directly or indirectly affect one or more components or pieces of equipment associated with wellbore drilling assembly 100, according to one or more embodiments. It should be noted that while FIG. 1 generally depicts a land-based drilling assembly, those skilled in the art will readily recognize that the principles described herein are equally applicable to subsea drilling operations that employ floating or sea-based platforms and rigs, without departing from the scope of the disclosure.

As illustrated, the drilling assembly 100 may include a drilling platform 102 that supports a derrick 104 having a traveling block 106 for raising and lowering a drill string 108. The drill string 108 may include, but is not limited to, drill pipe and coiled tubing, as generally known to those skilled in the art. A kelly 110 supports the drill string 108 as it is lowered through a rotary table 112. A drill bit 114 may be attached to the distal end of the drill string 108 and is driven either by a downhole motor and/or via rotation of the drill string 108 from the well surface. As the bit 114 rotates, it creates a borehole 116 that penetrates various subterranean formations 118.

A pump 120 (e.g., a mud pump) circulates a drilling fluid 122 through a feed pipe 124 and to the kelly 110, which conveys the drilling fluid 122 downhole through the interior of the drill string 108 and through one or more orifices in the drill bit 114. The drilling fluid 122 is then circulated back to the surface via an annulus 126 defined between the drill string 108 and the walls of the borehole 116. At the surface, the recirculated or spent drilling fluid 122 exits the annulus 126 and may be conveyed to one or more fluid processing unit(s) 128 via an interconnecting flow line 130. After passing through the fluid processing unit(s) 128, a "cleaned" drilling fluid 122 is deposited into a nearby retention pit 132 (i.e., a mud pit). While illustrated as being arranged at the outlet of the wellbore 116 via the annulus 126, those skilled in the art will readily appreciate that the fluid processing unit(s) 128 may be arranged at any other location in the drilling assembly 100 to facilitate its proper function, without departing from the scope of the disclosure. In an embodiment, fluid processing unit(s) 128 may be located off-site at a facility.

One or more additional additives may be added to the drilling fluid 122 via a mixing hopper 134 communicably coupled to or otherwise in fluid communication with the retention pit 132. The mixing hopper 134 may include, but is not limited to, mixers and related mixing equipment known to those skilled in the art. In other embodiments, however, additional additives may be added to the drilling fluid 122 at any other location in the drilling assembly 100. In at least one embodiment, for example, there could be more than one retention pit 132, such as multiple retention pits 132 in series. Moreover, the retention pit 132 may be representative of one or more fluid storage facilities and/or units where the additional additives may be stored, reconditioned, and/or regulated until added to the drilling fluid 122.

Certain embodiments of the present disclosure may be implemented at least in part with an information handling system 140. For purposes of this disclosure, an information handling system 140 may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system 140 may be a personal computer, a network storage device, or any other suitable device and may vary in size, shape, performance, functionality, and price. The information handling system 140 may include random access memory (RAM), one or more processing resources such as a central processing unit (CPU) or hardware or software control logic, ROM, and/or other types of nonvolatile memory. Additional components of the information handling system 140 may include one or more disk drives, one or more network ports for communication with external devices as well as various input and output (I/O) devices, such as a keyboard, a mouse, and a video display. The information handling system 140 may also include one or more buses operable to transmit communications between the various hardware components.

Certain embodiments of the present disclosure may be implemented at least in part with non-transitory computer-readable media. For the purposes of this disclosure, non-transitory computer-readable media may include any instrumentality or aggregation of instrumentalities that may retain data and/or instructions for a period of time. Non-transitory computer-readable media may include, for example, without limitation, storage media such as a direct access storage device (e.g., a hard disk drive or floppy disk drive), a sequential access storage device (e.g., a tape disk drive), compact disk, CD-ROM, DVD, RAM, ROM, electrically erasable programmable read-only memory (EEPROM), and/or flash memory; as well as communications media such wires, optical fibers, microwaves, radio waves, and other electromagnetic and/or optical carriers; and/or any combination of the foregoing.

As mentioned above, the drilling fluid 122 may directly or indirectly affect the components and equipment of the drilling assembly 100. For example, the disclosed drilling fluid 122 may directly or indirectly affect the fluid processing unit(s) 128 which may include, but is not limited to, one or more of a shaker (e.g., shale shaker), a centrifuge, a hydrocyclone, a separator (including magnetic and electrical separators), a desilter, a desander, a filter (e.g., diatomaceous earth filters), a heat exchanger, any fluid reclamation equipment. The fluid processing unit(s) 128 may further include one or more sensors, gauges, pumps, compressors, and the like used to store, monitor, regulate, and/or recondition the drilling fluid 122.

The drilling fluid 122 may directly or indirectly affect the pump 120, which representatively includes any conduits, pipelines, trucks, tubulars, and/or pipes used to fluidically convey the drilling fluid 122 downhole, any pumps, compressors, or motors (e.g., topside or downhole) used to drive the drilling fluid 122 into motion, any valves or related joints used to regulate the pressure or flow rate of the drilling fluid 122, and any sensors (i.e., pressure, temperature, flow rate, etc.), gauges, and/or combinations thereof, and the like. The disclosed drilling fluid 122 may also directly or indirectly affect the mixing hopper 134 and the retention pit 132 and their assorted variations.

The drilling fluid 122 may also directly or indirectly affect the various downhole equipment and tools that may come into contact with the drilling fluid 122 such as, but not limited to, the drill string 108, any floats, drill collars, mud motors, downhole motors and/or pumps associated with the drill string 108, and any MWD/LWD tools and related telemetry equipment, sensors or distributed sensors associated with the drill string 108. Drilling fluid 122 may also directly or indirectly affect any downhole heat exchangers, valves and corresponding actuation devices, tool seals, packers and other wellbore isolation devices or components, and the like associated with the wellbore 116. Drilling fluid 122 may also directly or indirectly affect the drill bit 114, which may include, but is not limited to, roller cone bits, PDC bits, natural diamond bits, any hole openers, reamers, coring bits, etc.

While not specifically illustrated herein, the drilling fluid 122 may also directly or indirectly affect any transport or delivery equipment used to convey the drilling fluid 122 to the drilling assembly 100 such as, for example, any transport vessels, conduits, pipelines, trucks, tubulars, and/or pipes used to fluidically move the drilling fluid 122 from one location to another, any pumps, compressors, or motors used to drive the drilling fluid 122 into motion, any valves or related joints used to regulate the pressure or flow rate of the drilling fluid 122, and any sensors (i.e., pressure and temperature), gauges, and/or combinations thereof, and the like.

Figure 2:
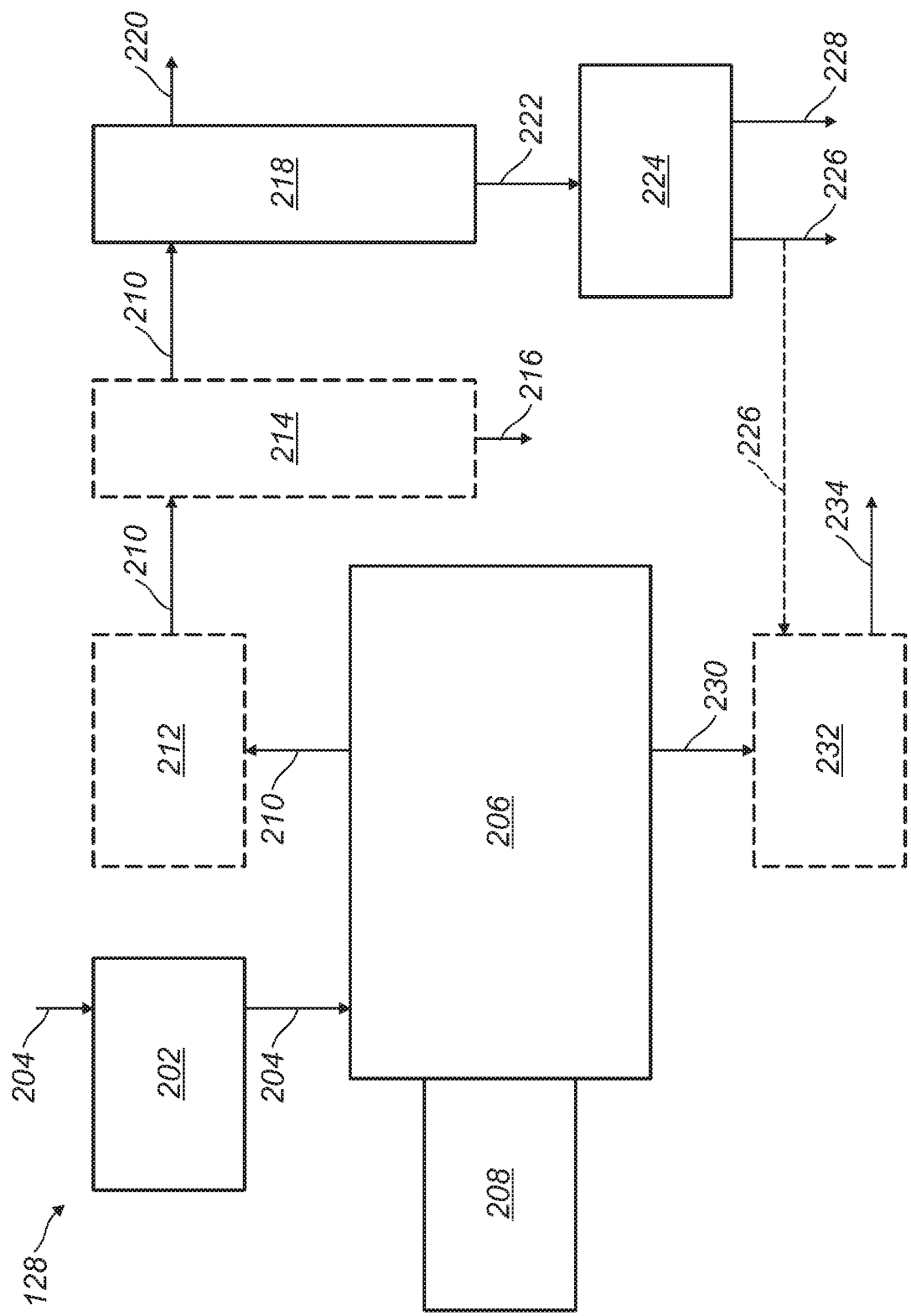
FIG. 2 illustrates an embodiment of fluid processing unit.

FIG. 2 illustrates an embodiment of fluid processing unit 128. The fluid processing unit 128 may include a hopper 202 to which the drilling waste fluid 204 may be loaded and mixed (e.g., homogenized). Drilling waste fluid 204 may be any fluid produced from subterranean formation 118 (referring to FIG. 1). Drilling waste fluid 204 may comprise, drilling fluid, cuttings, spent fluids, additives, hydrocarbons, the like, and/or any combination thereof. Hopper 202 feeds the drilling waste fluid 204 at an appropriate rate into a thermal extraction chamber 206. In an embodiment, drilling waste fluid 204 may not be pretreated before entering thermal extraction chamber 206. In an embodiment, drilling waste fluid 204 may be pretreated before entering thermal extraction chamber 206. Any suitable pre-treatment may be used and should not be limited herein. Any suitable thermal extraction chamber 206 capable of conveying, heating, and boiling off material may be used and should not be limited herein. In an embodiment, thermal extraction chamber 206 may operate at a temperature of about 150° C. to about 350° C. In an embodiment, thermal extraction chamber 206 may comprise an external heat source (not shown). Any suitable external heat source capable of operating temperatures of about 400° to about 1,000° C. may be used. Any suitable external heat source may be used and should not be limited herein. In an embodiment, thermal extraction chamber 206 may be a screw extruder. Any suitable screw extruder may be used. In an embodiment, the screw extruder may comprise an at least one screw (referring to FIG. 3) disposed within a barrel (not shown). Optionally, the screw extruder may comprise a plurality of screws disposed within a barrel. In an embodiment, thermal extraction chamber 206 may be a co-rotating dual screw extruder. Thermal extraction chamber 206 may further comprise a gearbox (not shown) that may be driven by a drive unit 208. Any suitable drive unit 208 may be used. In an embodiment, drive unit 208 may be a motor. Gearbox (not shown) may be connected to a screw. In an embodiment, gearbox (not shown) may be connected to a screw or a plurality of screws. The thermal extraction chamber 206 may produce evaporated fluid 210. In an embodiment, evaporated fluid may comprise any suitable components including but not limited to, water, oil, organic materials, inorganic materials, fine solids, the like, and/or any combination thereof.

In an embodiment, evaporated fluid 210 may then pass through an outlet port (not shown) and into scrubber 212. Any suitable scrubber capable of removing fines from evaporated fluid 210 may be used. Suitable scrubbers may include, but are not limited to, filters, cyclones, the like, and/or any combination thereof. In an embodiment, solids collected by scrubber 212 may be collected and stored (not shown).

Evaporated fluid 210 may then pass to an oil condenser 214 to recover heavy oil 216, if present. The evaporated fluid 210 (less heavy oil 216 if removed) may then pass to a steam condenser 218 that separates non-condensable gas 220 (e.g., nitrogen) from a mixture of water and light oil 222. Any suitable condensers may be used and should not be limited herein. The mixture of water and light oil 222 may then be processed in a separator 224 to produce recovered water 226 and recovered light oil 228. Solids 230 from the drilling waste fluid may be collected from thermal extraction chamber 206 and removed there from by way of an outlet port (not shown). In an embodiment, solids 230 may be stored or discarded as is. In some instances (e.g., with fine solids that easily become airborne), water (e.g., recovered water 226) or another fluid may be used to hydrate solids 230 in a rehydration unit 232 to produce hydrated solids 234. In an embodiment, the solids collected by scrubber 212 may be combined with solids 230. In an embodiment, the solids collected by scrubber 212 may be treated in a similar, but independent, process as solids 230.

In an embodiment, a system may include a programmable logic controller and sensors which may monitor and execute various steps of the methods described herein. For example, a thermal extraction chamber 206 may include sensors for monitoring temperature, which may be used to guide the feed rate of drilling waste fluid 204 into the thermal extraction chamber 206, the rotational speed of the screws in the thermal extraction chamber 206, and the rate at which low gravity solids are removed from the thermal extraction chamber 206.

In some instances, a system, or portion thereof, may be deployed on a truck, a barge (or other water-faring vessel), or the like and travel between well sites or drilling platforms to collect and process drilling waste fluid 204. Such embodiments may advantageously reduce the space for storage of drilling waste fluid 204, which may be especially advantageous for off-shore drilling platforms where space is a precious commodity.

Figure 3:
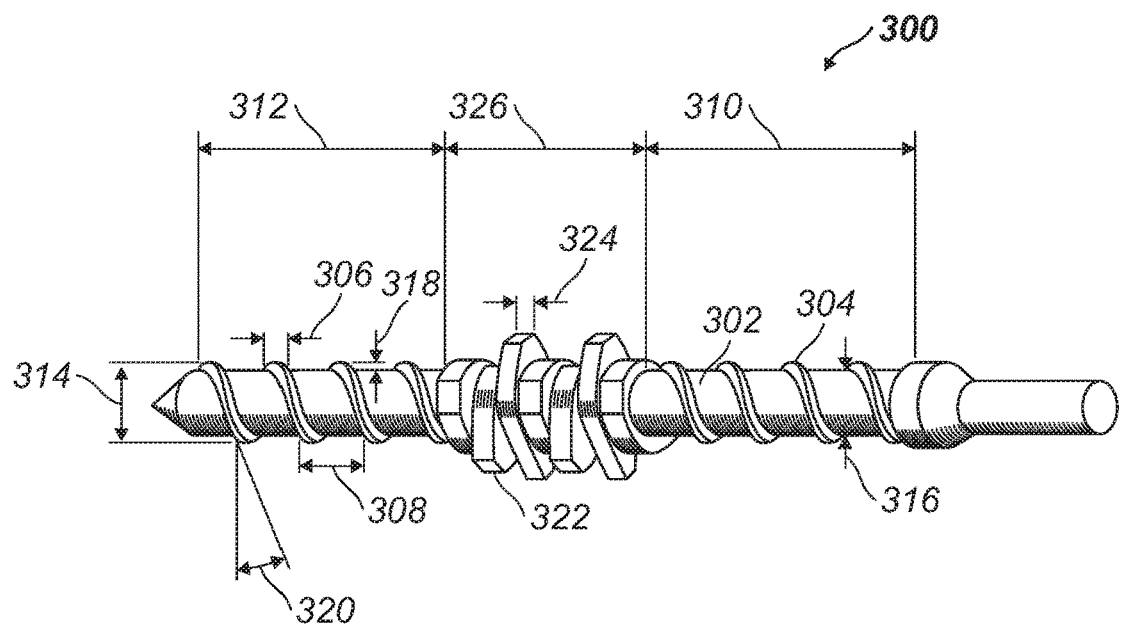
FIG. 3 illustrates an embodiment of a screw.

The thermal extraction chamber 206 (referring to FIG. 2) may comprise screw 300 as described in FIG. 3. In an embodiment, thermal extraction chamber 206 may comprise a plurality of screws 300. Any suitable screw 300 capable of conveying, heating, and material transfer such that evaporation of material occurs within thermal extraction chamber 206 may be used. In an embodiment, screw 300 may comprise an orifice (referring to FIG. 5) and an internal heating element (referring to FIG. 5) disposed therein. In an embodiment, screw 300 may comprise a plurality of orifices and a plurality of internal heating elements. Screw 300 may comprise any suitable metal or metal alloy. As used herein, "metal alloy" refers to a mixture of two or more elements, wherein at least one of the elements is a metal. In an embodiment, screw 300 may comprise at least one metal selected from the group consisting of, lithium, sodium, potassium, rubidium, cesium, francium, beryllium, magnesium, calcium, strontium, barium, radium, aluminum, gallium, indium, tin, thallium, lead, bismuth, scandium, titanium, vanadium, chromium, manganese, iron, cobalt, nickel, copper, zinc, yttrium, zirconium, niobium, molybdenum, technetium, ruthenium, rhodium, palladium, silver, cadmium, lanthanum, hafnium, tantalum, tungsten, rhenium, osmium, iridium, platinum, gold, graphite, and combinations thereof. In an embodiment, screw 300 may comprise a hardened steel metal alloy.

Screw 300 may comprise any suitable geometry. In an embodiment, the geometry of screw 300 may be selected such that the mixing mechanics of the screws may be maximized while minimizing the amount of revolutions per minute (RPM) required to mix drilling waste fluid 204. Screw 300 may require any suitable amount of RPMs capable of creating sufficient mixing intensity for the drilling waste fluid 204 and should not be limited herein. In an embodiment, screw 300 may require about 10 RPMs to about 60 RPMs, or about 100 RPMs to about 200 RPMs, and/or any value or range of values therein. Screw 300 may comprise any suitable surface area for a given application. Suitable surface areas for a single screw may include, but are not limited to, from about 1 $m^2$ to about 100 $m^2$, or any value or range of values therein. In an embodiment, two screws 300 may be used in thermal extraction chamber 206. The two screws 300 may comprise any suitable combined surface area including but not limited to, about 1 $m^2$ to about 100 $m^2$, or about 1 $m^2$ to about 50 $m^2$, or about 1 $m^2$ to about 10 $m^2$, or any value or range of values therein. Screw 300 may comprise any suitable outer diameter 314 including but not limited to, ranging from about 60 mm to about 1000 mm, or about 60 mm to about 600 mm, or about 60 mm to about 300 mm, or any value or range of values therein. Screw 300 may comprise shaft 302. In an embodiment, shaft 302 may be hollow. Optionally, shaft 302 may comprise an internal heating element (referring to FIG. 4). Shaft 302 may comprise any suitable diameter 316 including but not limited to, ranging from about 50 mm to about 900 mm, or about 50 mm to about 590 mm, or about 50 mm to about 290 mm, or any value or range of values therein. Shaft 302 may be of any suitable length including but not limited to, ranging from about 10 mm to about 100 mm, or about 10 mm to about 75 mm, or about 10 mm to about 50 mm, or any value or range of values therein. Screw 300 may further comprise flite 304. As used herein, flite 304 may be defined as a helical thread or raised portion of screw 300. Flite 304 may be any raised portion either partially, completely, or repeatedly turned about shaft 302. Flite 304 may be of any suitable flite width 306, flite depth 318, helix angle 320, and should not be limited herein. Helix angle 320 as used herein may refer to the angle of flite 304 relative to a plane perpendicular to the screw plane.

In an embodiment, screw 300 may comprise a plurality of flites 304 spaced longitudinally about the center axis of screw 300 at a predetermined pitch 308. Pitch 308 as used herein may be defined as the distance between two consecutive flites 304. Flites 304 may comprise any suitable pitch 308 and should not be limited herein. In an embodiment, a plurality of flites 304 may form flite segments 310, 312. Flite segments 310, 312 may comprise any number of flites 304 for a given application and should not be limited herein. Screw 300 may comprise any suitable number of flite segments 310, 312 and should not be limited herein. In an embodiment, flite segment 310 and flite segment 312 may comprise varying pitches 308, flite widths 306, number of flites 304, outer diameters 314, flite depths 318, shaft diameters 316, the like, and/or any combination thereof. In an embodiment, flite segment 310 may comprise different parameters and/or characteristics from flite segment 312. In an embodiment, flite segments 310 and flite segment 312 may comprise the same parameters and/or characteristics.

In an embodiment, screw 300 may comprise kneading block 322. Any suitable kneading block 322 capable of reducing and/or stopping the flow of drilling waste fluid 204 (referring to FIG. 2) through thermal extraction chamber 206 thereby increasing the amount of time the drilling waste fluid remains in the thermal extraction chamber 206 may be used. Kneading block 322 may comprise any suitable metal or metal alloy. In an embodiment, kneading block 322 may comprise at least one metal selected from the group consisting of, lithium, sodium, potassium, rubidium, cesium, francium, beryllium, magnesium, calcium, strontium, barium, radium, aluminum, gallium, indium, tin, thallium, lead, bismuth, scandium, titanium, vanadium, chromium, manganese, iron, cobalt, nickel, copper, zinc, yttrium, zirconium, niobium, molybdenum, technetium, ruthenium, rhodium, palladium, silver, cadmium, lanthanum, hafnium, tantalum, tungsten, rhenium, osmium, iridium, platinum, gold, graphite, and combinations thereof. In an embodiment, kneading block 322 may comprise a hardened steel metal alloy. Kneading block 322 may be of any suitable cross-sectional shape for a given application. In an embodiment, suitable cross-sectional shapes for kneading block 322 may include but are not limited to circle, oval, ellipse, parabola, hyperbola, triangle, square, rectangle, octagon, hexagon, pentagon, trapezium, parallelogram, rhombus, kite, heptagon, nonagon, decagon, four point star, five point star, six point star, heart, crescent, cross, polygon, crescent, the like, and/or any combination thereof. Kneading block 322 may be of any suitable shape and/or width 324 and should not be limited herein. In an embodiment, screw 300 may comprise a plurality of kneading blocks 322 thereby forming a kneading block sequence 326. Kneading block sequence 326 may be used to aggressively mix drilling waste fluid 204 within thermal extraction chamber 206 (referring to FIG. 2). In an embodiment, the first kneading block 322 in kneading block sequence 326 may begin at any given angle relative to the center axis of screw 300. Each proceeding kneading block 322 within kneading block sequence 326 may be rotated by an angle relative to the kneading block 322 immediately preceding it until the last kneading block 322 in the sequence may be in the same position as the first kneading block 322 in the kneading block sequence 326. In other words, each kneading block 322 within the sequence 326 must be rotated by an angle relative to the kneading block 322 immediately preceding until the kneading blocks 322 have rotated 360°. Any suitable angle may be used to produce kneading block sequence 326 and should not be limited herein. In an embodiment, each proceeding kneading block 322 may be rotated by an angle ranging from about 1° to about 360°, about 1° to about 90°, about 90° to about 180°, or about 180° to about 360°, or about 1° to about 180°, any combination thereof, or any angle encompassed therein. Any suitable number of kneading blocks 322 may be used to complete kneading block sequence 326.

In an embodiment, screw 300 may comprise kneading block sequence 326 and flite segments 310, 312, wherein the kneading block sequences and the flite segments may be sequentially alternating along shaft 302. Screw 300 may comprise any suitable configuration comprising kneading block sequence 326 and flite segments 310, 312 and should not be limited herein.

Figure 4:
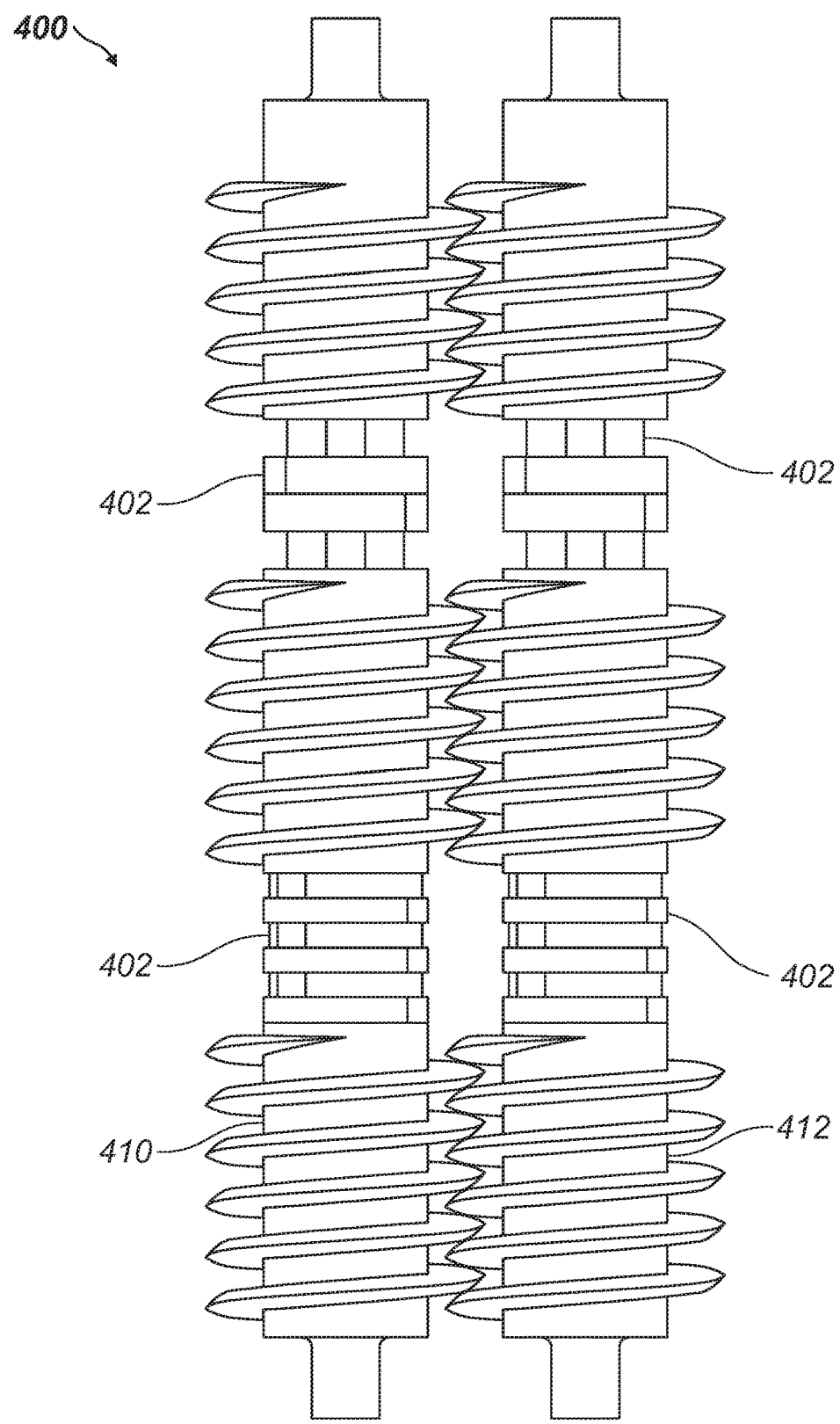
FIG. 4 illustrates an embodiment of a intermeshing co-rotating screw extruder.

FIG. 4 illustrates an embodiment of an intermeshing co-rotating screw extruder 400. In an embodiment, the screws may be positioned such that the flites of a first screw 410 are intermeshing with the flites of a second screw 412. The flites may be intermeshed with each other so that the outer diameter of each flite may be spaced a short distance from the opposite screw. In an embodiment, first screw 410 may be positioned alongside second screw 412 such that drilling waste fluid resides between the flites of first screw 410 and second screw 412. In an embodiment, internal heating elements (referring to FIG. 5) may be disposed within first screw 410 and second screw 412. In an embodiment, the profile of first screw 410 may be identical to the profile of second screw 412. In an embodiment, kneading block segments 402 may be selected so that kneading blocks 322 (referring to FIG. 3) may reduce and/or stop the flow of material (e.g. drilling waste fluid) through co-rotating screw extruder 400, thereby increasing the amount of time the material may remain in the co-rotating screw extruder 400. In an embodiment, this may allow the material to experience higher mixing intensities by which improve the overall heat transfer rate into the feed material thus increasing the though put of the system. The assembly of the barrel and screws, with suitable bearings, synchronizing gears, and material inlet and outlet ports, and a heat source media or mechanism, constitutes a thermal extraction chamber. In an embodiment, a heat source media or mechanism may include an internal heating element (referring to FIG. 5). It should be noted that this embodiment is merely an example of an intermeshing co-rotating screw extruder and should not be limited herein. Any suitable intermeshing co-rotating screw extruder may be used.

Figure 5:
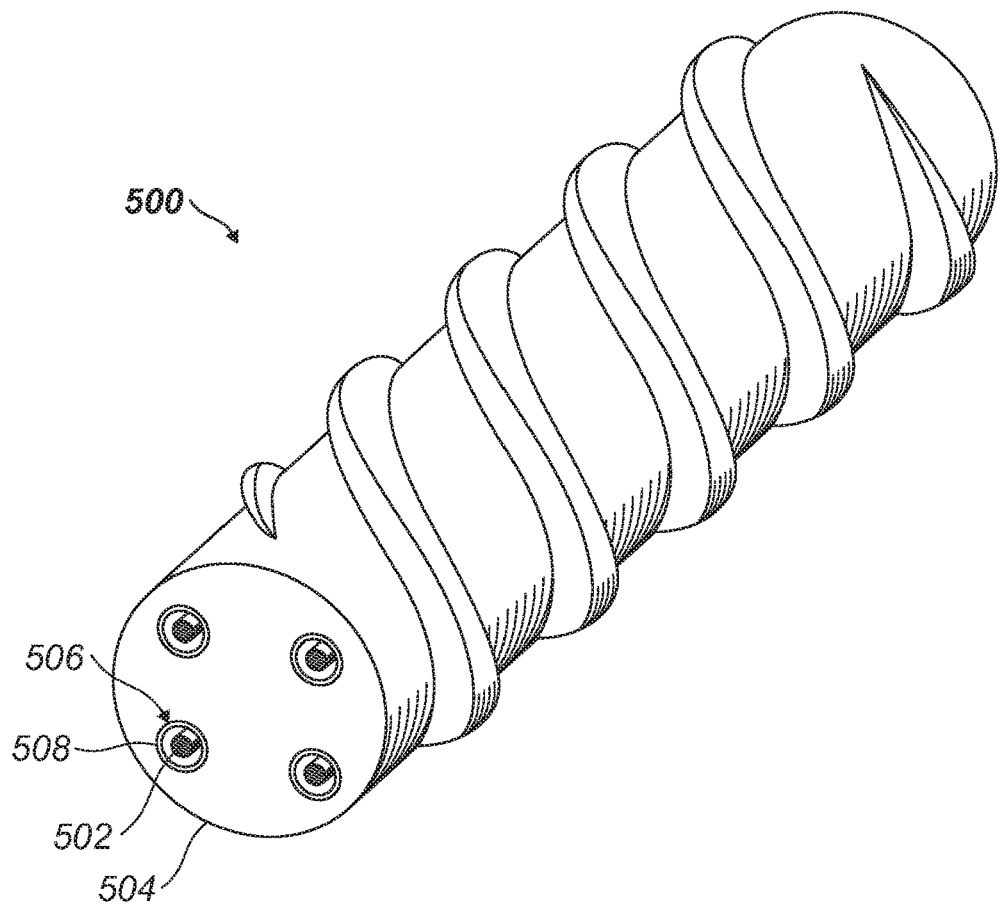
FIG. 5 illustrates an embodiment of a screw comprising an internal heating element disposed within a shaft.

FIG. 5 illustrates an embodiment of screw 500 comprising internal heating element 502 disposed within shaft 504. In an embodiment, screw 500 may comprise a plurality of internal heating elements 502. In an embodiment, shaft 504 may comprise an orifice 506. In an embodiment, shaft 504 may comprise a plurality of orifices 506. Orifice 506 may extend longitudinally through at least a portion of shaft 504. In an embodiment, orifice 506 may extend longitudinally through the entire length of shaft 504. Orifice 506 may have any suitable diameter including, but not limited to, about 25 to about 250, or about 25 to about 150, or about 25 to about 50. In an embodiment, internal heating element 502 may be disposed within orifice 506. Internal heating element may be of any suitable size capable of at least partially filling orifice 506. Suitable sizes for internal heating element 502 may include, but not limited to, about 25 mm to about 250 mm, or about 25 mm to about 150 mm, or about 25 mm to about 50 mm, or any value or range of values therein. Any internal heating element capable of converting a desired amount of energy into heat may be used. In an embodiment, internal heating element 502 may produce heat in an amount of about 1 kW to about 100 kW, or about 1 kW to about 75 kW, or about 1 kW to about 10 kW, or any value or range of values therein.

In an embodiment, shaft 504 may comprise a plurality of orifices 506. Shaft 504 may comprise any suitable number of orifices 506 including, but not limited to, about 1 to about 10, or about 1 to about 5, or about 1 to about 2, or any value or range of values therein. In an embodiment, each orifice 506 may comprise an internal heating element 502. In an embodiment, not all orifices 506 may comprise an internal heating element 502. Shaft 504 may comprise any suitable number of internal heating elements and should not be limited herein. A suitable number of internal heating elements may include, but are not limited to, 1 to about 10, or about 1 to about 5, or about 1 to about 2 or any range therein. In an embodiment, shaft 504 may comprise four orifices 506 and four internal heating elements 502.

Any suitable internal heating element 502 capable of transferring thermal energy may be used. Some examples of heat transfer media that may be used may include, but are not limited to, electrical resistive elements, fluids capable of exothermic chemical reactions, convective and or heat conductive fluids, the like, and/or any combination thereof. Suitable internal heating elements 502 may include, but are not limited to, high watt density cartridge heaters, cartridge heaters, hot oil, ceramic heaters, cast heaters, steam, molten salt, electrical resistance heaters, induction heaters, the like, and/or any combination thereof. In an embodiment, any suitable internal heating element 502 capable of reaching temperatures of about 400° C. or greater may be used. In an embodiment, internal heating element 502 may be a cartridge heater. In an embodiment, internal heating element 502 may be secured within shaft 504 in any suitable manner. In an embodiment, a slip ring 508 may be disposed within shaft 504. In an embodiment, slip ring 508 may be an electrical slip ring 508. Slip ring 508 may be energized and therefor may electrically connect internal heating element 502 to an electrical power source (not shown). In an embodiment, the electrical power source may be located at any suitable location. Any suitable electrical power source may be used and should not be limited herein. In an embodiment, internal heating element 502 may comprise a fluid or gas. A fluid or a gas (not shown) may be heated outside of thermal extraction chamber 206 in an external heat source (not shown) and transferred into screw 500. In an embodiment, internal heating element 502 may function similar to a shell-and-tube heat exchanger. In an embodiment, slip ring 508 may be a hydraulic slip ring capable of transferring a fluid or a gas into and/or out of screw 500.

In an embodiment, internal heating element 502 may be controlled by a programmable logic controller that may utilize a power control contactor bucket. In an embodiment, contactor bucket may operate based upon logic and readings from a thermocouple and may determine when and for what duration internal heating element 502 may be operated. In an embodiment, the programmable logic controller and/or the contactor bucket may be disposed within a information handling system 140 (referring to FIG. 1). In an embodiment, thermocouples (not shown) may help regulate the temperature of screw 500. Thermocouples may be within screw 500. In an embodiment, thermocouple may measure and control the temperature of the screw 500. In an embodiment, internal heating element 502 may be powered by an electrical power source (not shown). In an embodiment, electrical power source may comprise a generator, a power control system (i.e., a contactor bucket), an external heat source, the like, and/or any combination thereof. Electrical power source may provide any suitable amount of energy to internal heating element 502 for a given application. Suitable amounts of energy may include, but are not limited to, from about 1 kW to about 500 kW, or from about 1 kW to about 250 kW, or any value or range of values therein. In an embodiment, the amount of heat energy input to screw 500 or a plurality of screws 500 may be linearly proportional to the reduction in the required size of screw 500. In a non-limiting example, two screws 500 may be utilized in a thermal extraction chamber 506 in which the screws 500 may have a heating capacity of about 100 kW. Each screw 500 may have a heating capacity of about 50 kW, therefor the size requirement of each screw 400 may be reduced by about 50%.

Accordingly, this disclosure describes methods, systems, and apparatuses that may use the disclosed screws. The methods, systems, and apparatuses may include any of the following statements:

Statement 1. A method for separating a drilling waste fluid, the method comprising: introducing the drilling waste fluid into a thermal extraction chamber via a hopper; allowing the drilling waste fluid to flow longitudinally along two screws disposed within the thermal extraction chamber, wherein each screw comprises a shaft, an orifice, and an internal heating element; allowing the internal heating element to provide heat to the thermal extraction chamber; allowing the at least a portion of the drilling waste fluid to evaporate; removing the evaporated fluid through a first outlet port; and removing the solids through a second outlet port.

Statement 2. The method of statement 1, wherein the internal heating element may be at least one internal heating element selected from the group consisting of a high wattage density cartridge heater, a cartridge heater, hot oil, a ceramic heater, a cast heater, steam, molten salt, an electrical resistance heater, an induction heater, and any combination thereof.

Statement 3. The method of statement 1 or 2, further comprising an electrical power source.

Statement 4. The method of any of the preceding statements, further comprising providing about 1 kW to about 500 kW of energy to the internal heating element via the electrical power source.

Statement 5. The method of any of the preceding statements, wherein the internal heating element is controlled by a programmable logic controller.

Statement 6. The method of any of the preceding statements, wherein each screw comprises a plurality of orifices.

Statement 7. The method of any of the preceding statements, wherein an internal heating element is disposed within each orifice.

Statement 8. The method of any of the preceding statements, wherein each screw has a total surface area of about 1 m$^2$ to about 15 m$^2$.

Statement 9. The method of any of the preceding statements, wherein the two screws have a combined surface area of about 1 m$^2$ to about 20 m$^2$.

Statement 10. The method of any of the preceding statements, wherein the internal heating element provides heat to the thermal extraction chamber in an amount of about 1 kW to about 100 kW.

Statement 11. The method of any of the preceding statements, wherein each screw further comprises a thermocouple.

Statement 12. The method of any of the preceding statements, further comprising: determining a temperature of the two screws; transmitting the temperature of the two screws to a programmable logic controller, wherein the programmable logic controller controls the internal heating element; allowing the internal heating element to operate for a determined amount of time; shutting off the internal heating element via the programmable logic controller.

Statement 13. A thermal extraction chamber for separating drilling waste fluids, wherein the thermal extraction chamber comprises: a barrel; a first screw; a second screw, wherein the first screw and the second screw comprise a shaft, an orifice, and an internal heating element; an inlet port; a first outlet port; and a second outlet port.

Statement 14. The thermal extraction chamber of statement 13, further comprising an electrical power source, wherein the electrical power source provides about 1 kW to about 500 kW of energy to the internal heating element.

Statement 15. The thermal extraction chamber of statement 13 or 14, wherein the first screw and the second screw comprise a thermocouple.

Statement 16. The thermal extraction chamber of any of the preceding statements, wherein the first screw and the second screw further comprise a slip ring disposed between the shaft and the internal heating element within the orifice.

Statement 17. The thermal extraction chamber of any of the preceding statements, wherein the orifice extends longitudinally through the shaft, wherein the internal heating element is disposed within the orifice.

Statement 18. The thermal extraction chamber of any of the preceding statements, further comprising a programmable logic controller, wherein the programmable logic controller controls the internal heating element.

Statement 19. The thermal extraction chamber of any of the preceding statements, wherein the internal heating element may be at least one internal heating element selected from the group consisting of a high wattage density cartridge heater, a cartridge heater, hot oil, a ceramic heater, a cast heater, steam, molten salt, an electrical resistance heater, an induction heater, and any combination thereof.

Statement 20. The thermal extraction chamber of any of the preceding statements, further comprising: an electrical power source, wherein the electrical power source provides about 1 kW to about 500 kW of energy to the internal heating element; a thermocouple; a programmable logic controller, wherein the programmable logic controller controls the internal heating element; and a slip ring disposed between the shaft and the internal heating element within the orifice.

It should be understood that the compositions and methods are described in terms of "comprising," "containing," or "including" various components or steps, the compositions and methods can also "consist essentially of" or "consist of" the various components and steps. Moreover, the indefinite articles "a" or "an," as used in the claims, are defined herein to mean one or more than one of the element that it introduces.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

Therefore, the present disclosure is well adapted to attain the ends and advantages mentioned as well as those that are inherent therein. The particular examples disclosed above are illustrative only, as the present disclosure may be modified and practiced in different but equivalent manners apparent to those skilled in the art having the benefit of the teachings herein. Although individual examples are discussed, the disclosure covers all combinations of all those examples. Furthermore, no limitations are intended to the details of construction or design herein shown, other than as described in the claims below. Also, the terms in the claims have their plain, ordinary meaning unless otherwise explicitly and clearly defined by the patentee. It is therefore evident that the particular illustrative examples disclosed above may be altered or modified and all such variations are considered within the scope and spirit of the present disclosure. If there is any conflict in the usages of a word or term in this specification and one or more patent(s) or other documents that may be incorporated herein by reference, the definitions that are consistent with this specification should be adopted.

What is claimed is:

1. A method for separating a drilling waste fluid, the method comprising:
   introducing the drilling waste fluid into a thermal extraction chamber via a hopper;
   allowing the drilling waste fluid to flow longitudinally along two screws disposed within the thermal extraction chamber, wherein each screw comprises a shaft, an orifice, and an internal heating element;
   allowing the internal heating element to provide heat to the thermal extraction chamber;
   allowing the at least a portion of the drilling waste fluid to evaporate;
   removing the evaporated fluid through a first outlet port;
   removing the solids through a second outlet port;
   determining a temperature of the two screws;
   transmitting the temperature of the two screws to a programmable logic controller, wherein the programmable logic controller controls the internal heating element;
   allowing the internal heating element to operate for a determined amount of time; and
   shutting off the internal heating element via the programmable logic controller.

2. The method of claim 1, wherein the internal heating element may be at least one internal heating element selected from the group consisting of a high wattage density cartridge heater, a cartridge heater, hot oil, a ceramic heater, a cast heater, steam, molten salt, an electrical resistance heater, an induction heater, and any combination thereof.

3. The method of claim 1, further comprising an electrical power source.

4. The method of claim 3, further comprising providing about 1 kW to about 500 kW of energy to the internal heating element via the electrical power source.

5. The method of claim 1, wherein each screw comprises a plurality of orifices.

6. The method of claim 5, wherein an internal heating element is disposed within each orifice.

7. The method of claim 1, wherein each screw has a total surface area of about 1 m2 to about 15 m2.

8. The method of claim 1, wherein the two screws have a combined surface area of about 1 m2 to about 20 m2.

9. The method of claim 1, wherein the internal heating element provides heat to the thermal extraction chamber in an amount of about 1 kW to about 100 kW.

10. The method of claim 1, wherein each screw further comprises a thermocouple.

11. The method of claim 1, wherein the thermal extraction chamber comprises:
    a barrel.

12. The method of claim 1, wherein the two screws comprise a thermocouple.

13. A thermal extraction chamber for separating drilling waste fluids, wherein the thermal extraction chamber comprises:
    a barrel;
    a first screw;
    a second screw,
       wherein the first screw and the second screw comprise a shaft, an orifice, and an internal heating element;
       wherein the first screw and the second screw further comprise a slip ring disposed between the shaft and the internal heating element within the orifice; an electrical power source, wherein the electrical power source provides about 1 kW to about 500 kW of energy to the internal heating element an inlet port;

a first outlet port; and a second outlet port.

14. The thermal extraction chamber of claim 13, wherein the first screw and the second screw comprise a thermocouple.

15. The thermal extraction chamber of claim 13, wherein the orifice extends longitudinally through the shaft.

16. The thermal extraction chamber of claim 13, further comprising a programmable logic controller, wherein the programmable logic controller controls the internal heating element.

17. The thermal extraction chamber of claim 13, wherein the internal heating element may be at least one internal heating element selected from the group consisting of a high wattage density cartridge heater, a cartridge heater, hot oil, a ceramic heater, a cast heater, steam, molten salt, an electrical resistance heater, an induction heater, and any combination thereof.

18. The thermal extraction chamber of claim 13, further comprising:

a thermocouple;

a programmable logic controller, wherein the programmable logic controller controls the internal heating element; and.

* * * * *